(12) United States Patent
Weese et al.

(10) Patent No.: US 11,393,099 B2
(45) Date of Patent: Jul. 19, 2022

(54) IMAGE SEGMENTATION AND PREDICTION OF SEGMENTATION

(71) Applicant: KONINKLIJKE PHILIPS N.V., Eindhoven (NL)

(72) Inventors: Rolf Jürgen Weese, Norderstedt (DE); Alexandra Groth, Hamburg (DE); Jochen Peters, Norderstedt (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 147 days.

(21) Appl. No.: 16/492,211

(22) PCT Filed: Mar. 2, 2018

(86) PCT No.: PCT/EP2018/055140
§ 371 (c)(1),
(2) Date: Sep. 9, 2019

(87) PCT Pub. No.: WO2018/162338
PCT Pub. Date: Sep. 13, 2018

(65) Prior Publication Data
US 2020/0005464 A1    Jan. 2, 2020

(30) Foreign Application Priority Data
Mar. 9, 2017  (EP) ................................. 17160172

(51) Int. Cl.
| *G06T 7/12* | (2017.01) |
| *G06T 7/149* | (2017.01) |
| *G06T 5/00* | (2006.01) |
| *G06T 7/174* | (2017.01) |
| *G06F 17/16* | (2006.01) |

(52) U.S. Cl.
CPC ................ *G06T 7/12* (2017.01); *G06F 17/16* (2013.01); *G06T 5/006* (2013.01); *G06T 7/149* (2017.01); *G06T 7/174* (2017.01); *G06T 2207/30004* (2013.01)

(58) Field of Classification Search
None
See application file for complete search history.

(56) References Cited

U.S. PATENT DOCUMENTS 9,280,819 B2 * 3/2016 Codella .................. G06K 9/621
2015/0213652 A1 * 7/2015 Voigt .................. G06K 9/6226
                                                                    382/131

OTHER PUBLICATIONS

International Search Report and Written Opinion, International Application No. PCT/EP2018/055140, dated Jun. 25, 2018.
(Continued)

*Primary Examiner* — Tahmina N Ansari
(74) *Attorney, Agent, or Firm* — Micah-Shalom Kesselman (57) ABSTRACT

Systems and methods are provided for generating and using statistical data which is indicative of a difference in shape of a type of anatomical structure between images acquired by a first imaging modality and images acquired by a second imaging modality. This statistical data may then be used to modify a first segmentation of the anatomical structure which is obtained from an image acquired by the first imaging modality so as to predict the shape of the anatomical structure in the second imaging modality, or in general, to generate a second segmentation of the anatomical structure as it may appear in the second imaging modality based on the statistical data and the first segmentation.

6 Claims, 6 Drawing Sheets

(56) References Cited

OTHER PUBLICATIONS

Tahmasebi, A. et al., "A statistical model-based technique for accounting for prostate gland deformation in endorectal coil-based MR imaging", Annual International Conference of the IEEE Engineering in Medicine and Biology Society. IEEE Engineering in Medicine and Biology Society. Annual Conference (vol. 2012 pp. 5412-5415 ) Aug. 2012.
Klyuzhin, I. et al., "Fully-Automated Segmentation of the Striatum in the PET IMR Images Using Data Fusion", 2012 IEEE Nuclear Science Symposiwn and Medical Imaging Conference Record.
Assen, H. et al., "3D Active Shape Model Matching for Left Ventricle Segmentation in Cardiac CT", Feb. 2003.
Ecabert, O. et al., "Automatic model-based segmentation of the heart in CT images", IEEE transactions on medical imaging (vol. 27 issue 9 pp. 1189-1201 ) Sep. 2008.
Kaus, M.R , Pekar, V , et al., "Automated 3-D PDM construction from segmented images using deformable models", IEEE Transactions on Medical Imaging (vol. 22 issue 8 pp. 1005-1013 ) Aug. 2003.
Chowdhury, N. et al., "Concurrent segmentation of the prostate on MRI and CT via linked statistical shape models for radiotherapy planning", Med. Phys. 39 (4), Apr. 2012.
Garcia, J. et al., "On-line multi-slice computed tomography interactive overlay with conventional X-ray: A new and advanced imaging fusion concept", International Journal of Cardiology 133 (2009) e101-e105.
Luo, Q. et al., "Segmentation of abdomen MR images using kernel graph cuts with shape priors", Luo et al. BioMedical Engineering OnLine 2013, 12:124, http://www.biomedical-engineering-online.com/content/12/1/124.

\* cited by examiner

IMAGE SEGMENTATION AND PREDICTION OF SEGMENTATION

This application is the U.S. National Phase application under 35 U.S.C. § 371 of International Application No. PCT/EP2018/055140, filed on 2 Mar. 2018, which claims the benefit of European Application Serial No. 17160172.7, filed 9 Mar. 2017. These applications are hereby incorporated by reference herein.

FIELD OF THE INVENTION

The invention relates to a system and a computer-implemented method for image segmentation, and to a system and a computer-implemented method for generating statistical data to be used in the image segmentation. The invention further relates to a computer readable medium comprising statistical data, to a workstation and imaging apparatus comprising either or both systems, and to a computer readable medium comprising instructions for causing a processor system to perform either or both methods.

BACKGROUND OF THE INVENTION

In clinical practice, often different imaging modalities are used to diagnose or treat a patient. Namely, different imaging modalities may show different aspects of the anatomy of a patient. As such, image data from different imaging modalities may have to be compared or commonly considered. A non-limiting example is that angiograms show the coronaries very well, but the heart itself is only a shadow. As such, the heart may be segmented in Computed Tomography (CT) or Magnetic Resonance (MR) images, and the segmentation then be overlaid onto X-ray images or angiograms to support guidance.

If such image data from different imaging modalities is available, it may be desirable to obtain a segmentation of an anatomical structure, such as an organ or part thereof, across such different imaging modalities. For example, a paper titled "*Concurrent segmentation of the prostate on MRI and CT via linked statistical shape models for radiotherapy planning*" by Chowdhury et al., Med. Phys. 39 (4), April 2012, describes a framework for building a linked statistical shape model (LSSM), which is said to be a statistical shape model (SSM) that links the shape variation of a structure of interest (SOI) across multiple imaging modalities. It is further said that the framework is particularly relevant in scenarios where accurate boundary delineations of the SOI on one of the modalities may not be readily available, or difficult to obtain, for training a SSM.

However, image data from a particular imaging modality may not always be available. Nevertheless, it may still be desirable to obtain the shape of an anatomical structure in the particular imaging modality, e.g., to perform measurements, to visualize its shape, etc.

SUMMARY OF THE INVENTION

It would be advantageous to obtain a system and method which provides a segmentation of an anatomical structure in a particular imaging modality even if no image from the particular imaging modality is available to the system and method.

The following aspects of the invention involve a) generating and b) using statistical data which is indicative of a difference in shape of a type of anatomical structure between images acquired by a first imaging modality and images acquired by a second imaging modality. This statistical data may then be used to modify a first segmentation of the anatomical structure which is obtained from an image acquired by the first imaging modality so as to predict the shape of the anatomical structure in the second imaging modality, or in general, to generate a second segmentation of the anatomical structure as it may appear in the second imaging modality based on the statistical data and the first segmentation.

A first aspect of the invention provides a system configured for image segmentation, comprising:
 an image data interface configured to access an image of an anatomical structure of a patient, wherein the image is acquired by a first imaging modality;
 a memory comprising instruction data representing a set of instructions;
 a processor configured to communicate with the image data interface and the memory and to execute the set of instructions, wherein the set of instructions, when executed by the processor, cause the processor to:
 segment the image to obtain a first segmentation of the anatomical structure of the patient; and
 access statistical data indicative of a difference in shape of the type of anatomical structure between a) images acquired by the first imaging modality and b) images acquired by a second imaging modality;
 based on the first segmentation and the statistical data, generate a second segmentation of the anatomical structure which represents an estimate of the shape of the anatomical structure of the patient in an image acquired by the second imaging modality.

A further aspect of the invention provides a system configured for generating statistical data for use in image segmentation, comprising:
 an image data interface configured to access a first set and a second set of images of a type of anatomical structure, wherein the first set of images is acquired by a first imaging modality and the second set of images is acquired by a second imaging modality;
 a memory comprising instruction data representing a set of instructions;
 a processor configured to communicate with the image data interface and the memory and to execute the set of instructions, wherein the set of instructions, when executed by the processor, cause the processor to:
 segment individual images of the first set of images to obtain a first set of segmentations of the type of anatomical structure;
 segment individual images of the second set of images to obtain a second set of segmentations of the type of anatomical structure;
 based on the first set of segmentations and the second set of segmentations, generate statistical data which is indicative of a difference in shape of the type of anatomical structure between a) the images acquired by the first imaging modality and b) the images acquired by the second imaging modality.

A further aspect of the invention provides a workstation or imaging apparatus comprising either or both systems. A further aspect of the invention provides a computer readable medium comprising the statistical data generated by the system.

A further aspect of the invention provides a computer-implemented method for image segmentation, comprising:
 accessing an image of an anatomical structure of a patient, wherein the image is acquired by a first imaging modality;

segmenting the image to obtain a first segmentation of the anatomical structure of the patient;

accessing statistical data indicative of a difference in shape of the type of anatomical structure between a) images acquired by the first imaging modality and b) images acquired by a second imaging modality; and based on the first segmentation and the statistical data, generating a second segmentation of the anatomical structure which represents an estimate of the shape of the anatomical structure of the patient in an image acquired by the second imaging modality.

A further aspect of the invention provides a computer-implemented method for generating statistical data for use in image segmentation, comprising:

accessing a first set and a second set of images of a type of anatomical structure, wherein the first set of images is acquired by a first imaging modality and the second set of images is acquired by a second imaging modality;

segmenting individual images of the first set of images to obtain a first set of segmentations of the type of anatomical structure;

segmenting individual images of the second set of images to obtain a second set of segmentations of the type of anatomical structure; and based on the first set of segmentations and the second set of segmentations, generating statistical data which is indicative of a difference in shape of the type of anatomical structure between a) the images acquired by the first imaging modality and b) the images acquired by the second imaging modality.

A further aspect of the invention provides a computer readable medium comprising transitory or non-transitory data representing instructions arranged to cause a processor system to perform either or both computer-implemented methods.

The above measures involve generating statistical data indicative of a difference in shape of a particular type of anatomical structure (e.g. a difference in physical shape of the underlying, actual or "real" anatomical structure), such as an organ, part of an organ, tissue, etc., between images acquired by two different imaging modalities. For example, a first set of images may be acquired by Ultrasound, and a second set of images may be acquired by MRI. The shape of the anatomical structure may not only vary across a given set of images, e.g., due to patient variability or, when pertaining to a same patient, changes in an anatomical structure over time, but also systematically between the different imaging modalities. Here, the term 'systematic' refers to the differences not residing in incidental differences in the anatomical structure across images, e.g., due to the abovementioned patient variability, but rather in the shape of the anatomical structure structurally differing between both imaging modalities. For example, such systematic differences may be caused by both imaging modalities employing a different imaging geometry, by parts of the anatomical structure being less visible in one of the imaging modalities, etc. Various other causes of such systematic differences may exist as well.

Having obtained two sets of images of the same type of anatomical structure but acquired by different imaging modalities, the difference in shape between both imaging modalities may be determined as follows. Namely, the anatomical structure may be segmented in each image to obtain a segmentation. For example, a mesh model may be used to segment the anatomical structure. Such a segmentation may provide a geometric description of the shape of the anatomical structure, which in turn allows the shape to be easily analyzed. The differences between the segmentations from both imaging modalities may then be determined using statistical analysis. A non-limiting example is that the mean shape of the anatomical structure in each imaging modality may be determined, e.g., in the form of a mean shape mesh model, with the difference then being determined by comparing both mean shapes. However, various other ways of determining the differences between two sets of segmentation may be used as well and are within reach of the skilled person. Here, known techniques from the field of statistical analysis may be used.

Having determined the difference in the shape of the anatomical structure between a first and a second imaging modality, the difference may be made available in the form of statistical data. This may allow a system which has access to an image from the first imaging modality to predict the shape of the anatomical structure as it would appear in an image from the second imaging modality, even if the latter image is unavailable. Namely, the anatomical structure may be segmented in the image, with the segmentation then being modified on the basis of the statistical data to obtain a segmentation of the anatomical structure which is likely to reflect the shape of the anatomical structure in the second imaging modality. Alternatively, the second segmentation may be directly generated using the statistical data and the first segmentation, e.g., without actually modifying the latter.

The above measures have the effect that a segmentation of an anatomical structure in a particular imaging modality may be obtained even if no image from the particular imaging modality is available. Even though this segmentation may represent an estimate or prediction rather than a delineation of the actual shape of the anatomical structure, this may still be advantageous in various scenarios. For example, even though the shape of an anatomical structure between two different imaging modalities may be roughly similar, it may still be desirable to perform the measurement in a specific one of the imaging modalities, e.g., to allow comparison to a "gold standard" which has been determined for this imaging modality, or in general to improve the comparability of measurements.

It will be appreciated that the above measures may also be used to predict the shape of the anatomical structure in further imaging modalities, e.g., a third and subsequent imaging modality, provided that appropriate statistical data is generated and/or available.

Optionally, the set of instructions, when executed by the processor, cause the processor to compute a measurement from the second segmentation of the anatomical structure. For example, the measurement may be a measurement of a volume, the measurement of a distance, the measurement of an area, the measurement of curvature, the measurement of a circumference, the measurement of a diameter, or a combination of one or several of these. The system may thus compute the measurement from the predicted shape of the anatomical structure in the second imaging modality. As also previously stated, this may improve the comparability of measurements, e.g., when past measurements have been performed or a "gold standard" has been determined using the second imaging modality.

Optionally, the image is a pre-interventional image, and the set of instructions, when executed by the processor, cause the processor to overlay the second segmentation of the anatomical structure over an interventional image which is acquired by the second imaging modality. This represents another advantageous use of the second segmentation.

Namely, the shape of the anatomical structure may be determined from a pre-interventional image and then, using the statistical data, translated to the expected shape in interventional images and finally overlaid over such images. This may be advantageous in case the interventional images cannot be segmented themselves, e.g., by the segmentation being too computationally complex to be performed in real-time, or by the image quality of the interventional images being insufficient to allow such segmentation to be performed.

Optionally, the first set of images and the second set of images comprise a set of image pairs, wherein each image pair is constituted by an image acquired by the first imaging modality and an image acquired by the second imaging modality, wherein both images of an image pair belong to a same patient. By using pairs of images which relate to a same anatomical structure, the difference in shape between the imaging modalities may be more accurately estimated since differences may be predominately due to the imaging modalities. This advantageous effect may even be obtained when both images are not acquired at the same time or during a same examination, as the differences in the anatomical structure itself will typically be relatively minor, e.g., less than between patients.

Optionally, the set of instructions, when executed by the processor, cause the processor to generate the statistical data by performing a principle component analysis of the first set of segmentations and the second set of segmentations simultaneously. It has been found that principle component analysis (PCA) is well suitable to determine the differences between different sets of segmentations of the type of anatomical structure.

Optionally, the set of instructions, when executed by the processor, cause the processor to generate the statistical data by:
- compute a first mean shape of the type of anatomical structure from the first set of segmentations;
- compute a second mean shape of the type of anatomical structure from the second set of segmentations;
- construct a matrix A for the principle component analysis from the differences between the first set of segmentations and the first mean shape and the differences between the second set of segmentations and the second mean shape;
- generate the statistical data based on the first mean shape, the second mean shape and the Eigenvectors of the matrix $AA^t$.

Optionally, the set of instructions, when executed by the processor, cause the processor to mutually register the first set of segmentations, to mutually register the second set of segmentations and to mutually register the first mean shape and the second mean shape before performing the principle component analysis. By performing a registration between the segmentations, the statistical analysis may focus on the difference in shape rather than a difference in position of the segmentations. For example, the first set of segmentations may all be registered with the first mean shape, second set of segmentations may all be registered with the second mean shape, and the first mean shape and the second mean shape may be mutually registered. Accordingly, all (mean) segmentations may be mutually registered.

Optionally, the set of instructions, when executed by the processor, cause the processor to generate the first set of segmentations and/or the second set of segmentations using model-based segmentation.

It will be appreciated by those skilled in the art that two or more of the above-mentioned embodiments, implementations, and/or optional aspects of the invention may be combined in any way deemed useful.

Modifications and variations of the workstation, the imaging apparatus, either computer-implemented method, and/or the computer program product, which correspond to the described modifications and variations of either or both systems, can be carried out by a person skilled in the art on the basis of the present description.

A person skilled in the art will appreciate that the systems and methods may be applied to image data acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will be apparent from and elucidated further with reference to the embodiments described by way of example in the following description and with reference to the accompanying drawings, in which.

It should be noted that the figures are purely diagrammatic and not drawn to scale. In the figures, elements which correspond to elements already described may have the same reference numerals.

LIST OF REFERENCE NUMBERS

The following list of reference numbers is provided for facilitating the interpretation of the drawings and shall not be construed as limiting the claims.

010 image repository
012 data communication
020 first set of images
025 second set of images
030 statistical data
040 image repository
042 data communication
050 image
060 display
062 display data
080 user input device 082 user input data
100 system for generating statistical data
120 image data interface
122 internal data communication
140 processor
142 internal data communication
160 memory
200 system for segmentation
220 image data interface
222 internal data communication
240 processor
242, 244 internal data communication
260 memory
280 user interface subsystem
282 display processor
284 user input interface
300, 302 histogram of scale factors
310, 312 bins representing scale factor
320, 322 occurrence
350, 352 point-to-surface distance between US and MR meshes
400 method for generating statistical data
410 accessing first set and second set of images
420 segmenting first set of images
430 segmenting second set of images
440 generating statistical data
500 method for image segmentation
510 accessing image of patient
520 accessing statistical data
530 segmenting the image
540 generating second segmentation
600 computer readable medium
610 non-transitory data

DETAILED DESCRIPTION OF EMBODIMENTS

Systems and methods are described for generating and using statistical data which is indicative of a difference in shape of a type of anatomical structure between images acquired by a first imaging modality and images acquired by a second imaging modality. This statistical data may then be used to modify a segmentation of the anatomical structure which is obtained from an image acquired by the first imaging modality so as to predict the shape of the anatomical structure in the second imaging modality. Accordingly, the statistical data may also be termed 'shape difference data', but is in this description referred to as statistical data since it is generated based on a statistical analysis of a set of segmentations.

Figure 1:
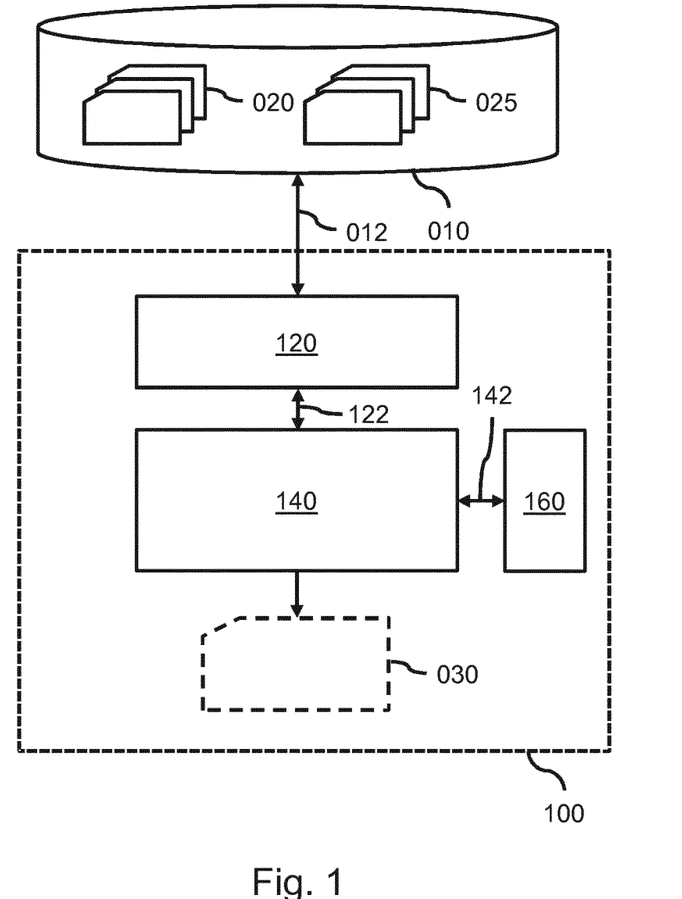
FIG. 1 shows a system for generating statistical data.

FIG. 1 shows a system 100 for generating the statistical data. The system 100 is shown to comprise an image data interface 120 configured to access, via data communication 012, a first set 020 and a second set 025 of images of a type of anatomical structure, with each of the sets having been acquired by a different imaging modality. In the example of FIG. 1, the image data interface 120 is shown to be connected to an external image repository 010 which comprises the image data of the sets of images 020, 025. For example, the image repository 010 may be constituted by, or be part of, a Picture Archiving and Communication System (PACS) of a Hospital Information System (HIS) to which the system 100 may be connected or comprised in. Accordingly, the system 100 may obtain access to the sets of images 020, 025 via the HIS. Alternatively, the sets of images 020, 025 may be accessed from an internal data storage of the system 100. In general, the image data interface 120 may take various forms, such as a network interface to a local or wide area network, e.g., the Internet, a storage interface to an internal or external data storage, etc.

The system 100 is further shown to comprise a processor 140 configured to internally communicate with the image data interface 120 via data communication 122, and a memory 160 accessible by the processor 140 via data communication 142.

The processor 140 may be configured to, during operation of the system 100, segment individual images of the first set of images 020 to obtain a first set of segmentations of the type of anatomical structure, segment individual images of the second set of images 025 to obtain a second set of segmentations of the type of anatomical structure, and based on the first set of segmentations and the second set of segmentations, generate statistical data 030 which is indicative of a difference in shape of the type of anatomical structure between a) the images acquired by the first imaging modality and b) the images acquired by the second imaging modality. FIG. 1 shows the statistical data 030 being output by the processor 140. For example, the statistical data 030 may be stored in the memory 160 or in another internal or external storage medium. Additionally or alternatively, the system 100 may comprise an output interface for outputting the statistical data 030, e.g., to another system.

Figure 2:
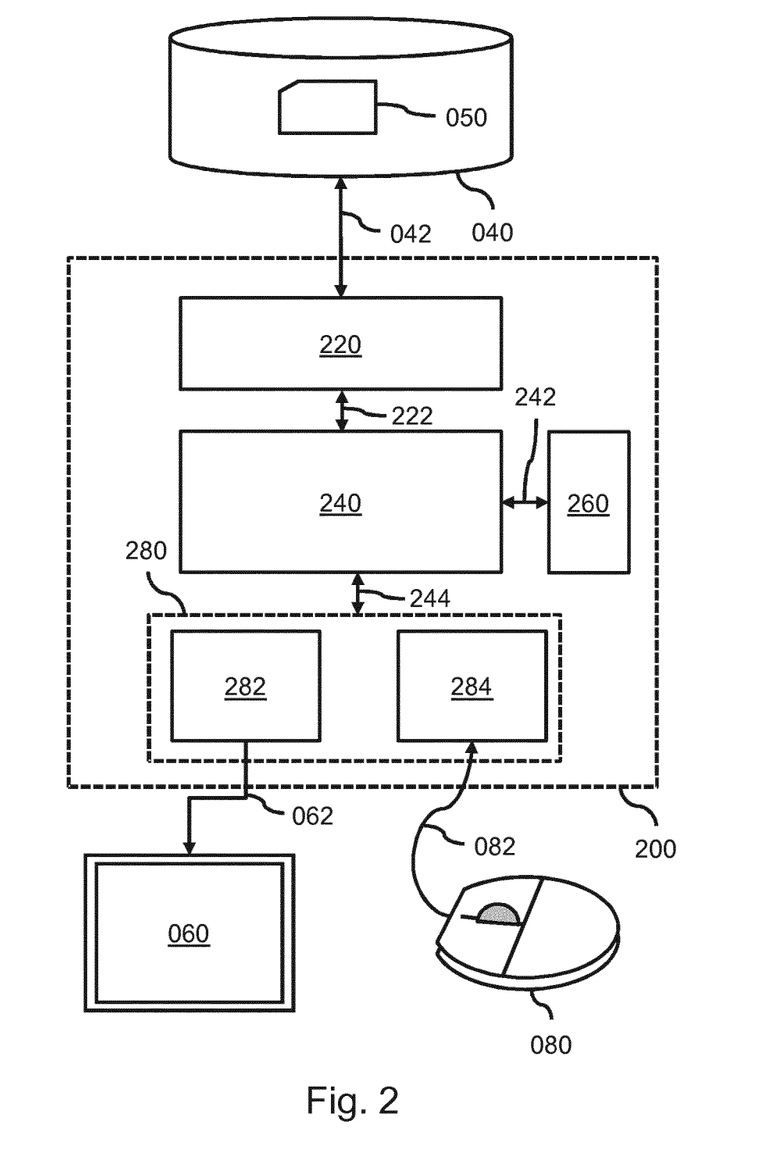
FIG. 2 shows a system for segmentation based on the statistical data.

FIG. 2 shows a system 200 for segmentation based on the statistical data. The system 200 is shown to comprise an image data interface 220 configured to access, via data communication 042, an image 050 which is acquired by a first imaging modality. The image data interface 220 may, but does not need to be, a same type of interface as the image data interface of the system of FIG. 1. In the example of FIG. 2, the image data interface 120 is shown to be connected to an external image repository 040 which comprises the image data of the image 050. The image repository 040 may, but does not need to be, a same type of repository as the image repository described with reference to the system of FIG. 1.

The system 100 is further shown to comprise a processor 240 configured to internally communicate with the image data interface 220 via data communication 222, a memory 260 accessible by the processor 240 via data communication 242, and a user interface subsystem 280 with a display processor 282 and a user input interface 284 which is configured to internally communicate with the processor 240 via data communication 244.

The processor 240 may be configured to, during operation of the system 200, segment the image 050 to obtain a first segmentation of the anatomical structure of the patient, access statistical data indicative of a difference in shape of the type of anatomical structure between a) images acquired by the first imaging modality and b) images acquired by a second imaging modality, and based on the first segmentation and the statistical data, generate a second segmentation of the anatomical structure which represents an estimate of the shape of the anatomical structure of the patient in an image acquired by the second imaging modality. Although the statistical data itself is not shown in FIG. 2, it may be accessed by the system 200 from a storage medium, e.g., the memory 260 or another storage medium, including but not limited to network-accessible storage media. For that purpose, the system 200 may comprise an input interface (not shown) such as a network interface.

The user interface subsystem 280 may be configured to, during operation of the system 200, enable a user to interact with the system 200 via a graphical user interface. For that purpose, the display processor 282 may be configured to generate display data 062 for a display 060 so as to display the graphical user interface to a user. The graphical user interface may be represented by a set of interface instructions stored as data in a memory accessible to the display processor 282, being for example the memory 260 or another memory of the system 200. The user input interface 284 may be configured to receive user input data 082 from a user device 080 operable by the user. The user input device 080 may take various forms, including but not limited to a computer mouse, touch screen, keyboard, microphone, etc. FIG. 2 shows the user input device to be a computer mouse 080. In general, the user input interface 284 may be of a type which corresponds to the type of user input device 080, i.e., it may be a thereto corresponding type of user device interface 284.

In general, each of the systems of FIGS. 1 and 2 may be embodied as—or in—a device or apparatus, such as a workstation or imaging apparatus. The device or apparatus may comprise one or more (micro)processors which execute appropriate software. The processor of each system may each be embodied by one or more of these (micro)processors, or by a same (micro)processor. Software implementing functionality of each system, may have been downloaded and/or stored in a corresponding memory or memories, e.g., in volatile memory such as RAM or in non-volatile memory such as Flash. Alternatively, the processor of each system may be implemented in the device or apparatus in the form of programmable logic, e.g., as a Field-Programmable Gate Array (FPGA). The image data interface and user input interface may be implemented by respective interfaces of the device or apparatus. In general, each unit of each system may be implemented in the form of a circuit. It is noted that each system may also be implemented in a distributed manner, e.g., involving different devices or apparatuses. For example, the distribution may be in accordance with a client-server model, e.g., using a server and a thin-client workstation.

FIGS. 3A-4B indicate the relevance of predicting the shape of an anatomical structure in a second imaging modality from a segmentation of the anatomical structure which is obtained from an image acquired by a first imaging modality. Namely, in clinical practice, measurements are frequently performed on image data from different modalities. An example for such a measurement is the ejection fraction of the left ventricle of the heart or the aortic valve opening area. Depending on the measured value being above or below a certain threshold, a disease may be diagnosed and treatment may be performed.

However, it has been found that there are systematic differences in the results depending on which imaging modality the measurements are performed. This followed from a comparison of a set of Magnetic Resonance (MR) segmentation results and corresponding Ultrasound (US) segmentation results, which involved comparing a US mesh to a corresponding MR mesh for a set of patients. Before a MR mesh and an US mesh were pairwise compared, the US mesh was registered to the MR mesh by applying a point-based transformation comprising rotation, translation, and, depending on the type of comparison, also a scaling. All registrations were performed with respect to the left ventricle, since the right ventricle and the atria were not fully covered by either of the two imaging modalities.

Figure 3A:
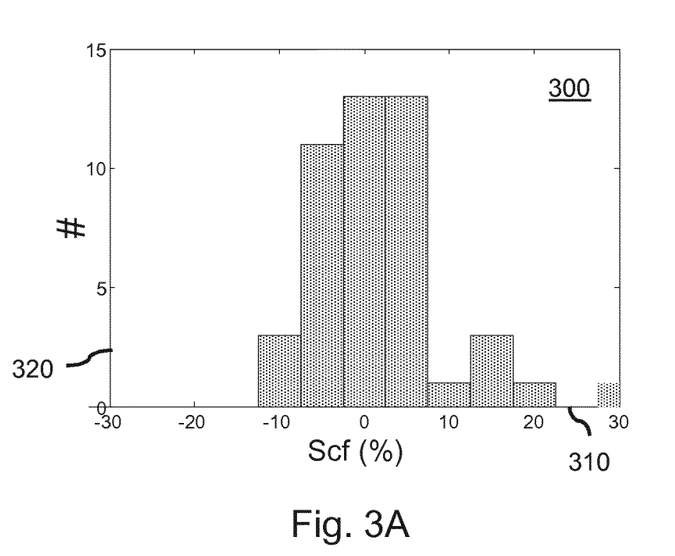
FIG. 3A shows a histogram of the scaling factor between mesh models obtained from cardiac segmentation of Ultrasound images and mesh models obtained from cardiac segmentation of Magnetic Resonance images for the end diastolic cardiac phase.
Figure 3B:
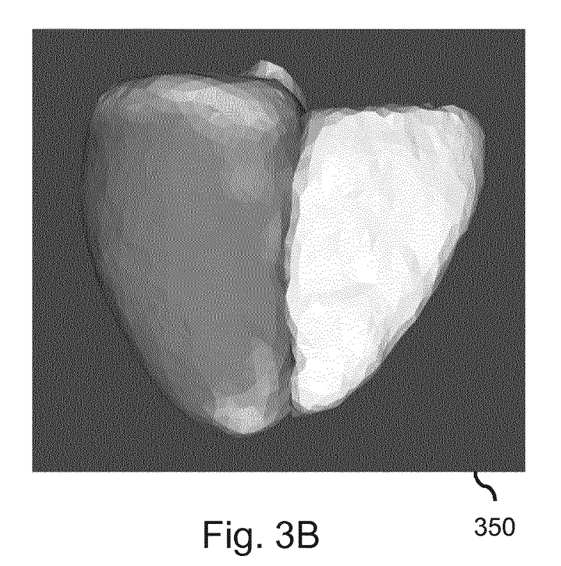
FIG. 3B shows a mesh model for cardiac segmentation, with the gray levels indicating the mean Euclidian point-to-surface distance between the Ultrasound mesh models and the Magnetic Resonance mesh models for the end diastolic cardiac phase.
Figure 4A:
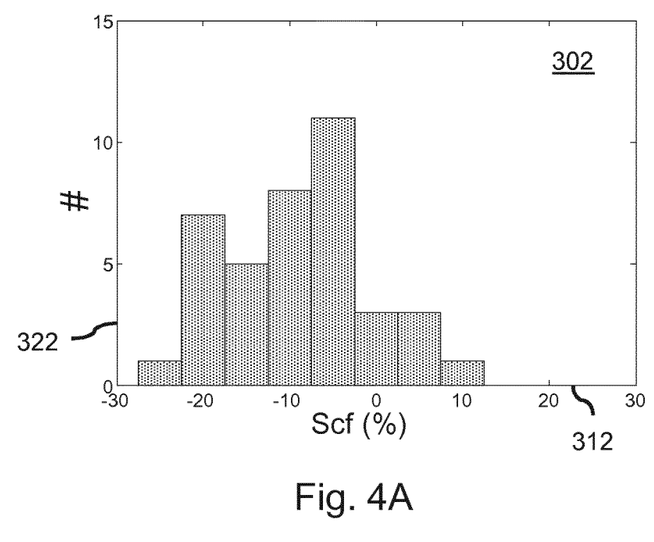
FIG. 4A corresponds to FIG. 3A but for the end systolic cardiac phase.

The scaling factors of a rigid point-based transformation including scaling were compared and are shown in FIGS. 3A and 4A for the end diastolic (ED) cardiac phase and the end systolic (ES) cardiac phase, respectively, with each figure showing a histogram 300, 302 of the scaling factor 310, 312 used in the transformation and the vertical axis indicating the occurrence 320, 322 of a particular scaling factor. It can be seen that there are systematic differences between the mesh models obtained from Ultrasound images and those obtained from Magnetic Resonance images, with the latter tending to be larger than the former (which is represented by a positive scaling factor). Namely, the MR meshes tended to be larger than the US meshes for the end diastolic cardiac phase, yielding scaling factors between approximately 10% and 30% and having a mean value of 8.74%. The scaling factor for the end systolic phase varied between 20% and 25% and had a mean value of 5.21%.

Figure 4B:
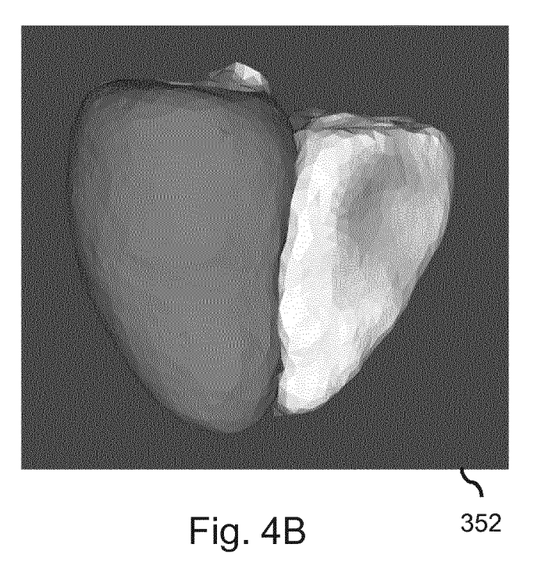
FIG. 4B corresponds to FIG. 3B but for the end systolic cardiac phase.

A second registration was performed to investigate the Euclidean distance between the MR mesh and the US mesh. For the second registration, a rigid point-based registration without scaling was applied (rotation and translation). For each triangle in the MR mesh, the closest triangle in the US mesh was determined by calculating the Euclidean distance between the triangles' centers. The Euclidean distance for each triangle was then averaged over all segmentation results and depicted in FIGS. 3B and 4B, where the gray levels indicate the mean Euclidian point-to-surface distance between the Ultrasound mesh models and the Magnetic Resonance mesh models for the end diastolic cardiac phase (FIG. 3B) and the end systolic cardiac phase (FIG. 4B). Although the exact magnitudes of mean Euclidian point-to-surface distance, e.g., how many millimeters, is not of particular relevance here, it can be seen that these differences are locally distributed rather than globally uniform, indicating that there exists a difference in shape rather than only a difference in size.

It is possible to compensate for such shape differences, or in particular to predict the shape of an anatomical structure in a second imaging modality from a segmentation of the anatomical structure which is obtained from an image acquired by a first imaging modality, as described in the following. Here, an exemplary embodiment is given which is considered as illustrative and as not limiting the invention, of which modifications may be made without departing from the scope of the invention as set forth in the claims.

It may be assumed that a set of S corresponding segmentation results of two imaging modalities are available that show the anatomical structure of interest in a corresponding state, with the anatomical structure of interest being in the following an organ. The corresponding state may, for example, be a same heart phase in the case of cardiac images, or in general there being no interventions between the acquisitions of the images.

Model-based segmentation may be used to segment the organ and to generate a set of corresponding points on the organ surface. An example of such model-based segmentation is described in "*Automatic Model-based Segmentation of the Heart in CT Images*" by Ecabert et al., IEEE Transactions on Medical Imaging 2008, 27(9), 1189-1201. An example of a set of M corresponding points on the organ surface is described in "*Automated 3-D PDM construction from segmented images using deformable models*" by Kaus et al., IEEE Transactions on Medical Imaging 2003, 22(8), 1005-1013. In a specific example, shape-constrained deformable models may be used, e.g., as described in "*Shape-constrained deformable models and applications in medical imaging*" by Weese et al., Lecture Notes in Computational Vision and Biomechanics, 14:151-184, 2014, which may take advantage of the a-priori knowledge about the shape of the object similar to active shape models, but which may also be flexible similar to active contour models.

In general, the models used in both imaging modalities may be the same, e.g., have a same geometry and level of detail, but may also differ in their geometry and/or level of detail. An example of the latter case is that for MR, a shape-constrained deformable cine model may be used which may have 7284 vertices and 14767 triangles, whereas for Ultrasound, a shape-constrained deformable model may be used having 2411 vertices and 5126 triangles and therefore having a coarser structure compared to the MR model.

In general, the segmentation may result in the shape of the organ of interest being represented as a point distribution model (PDM). The PDM or mesh of the first image modality may comprise M vertices while the mesh of the second image modality may comprise N vertices. Each vertex may represent a three-dimensional vector describing a position in space and may be referred to as $x_v^i$, with i being an index indicating the patient data set ($i \in \{1, \ldots, S\}$) and v giving the vertex number of the PDM ($v \in \{1, \ldots, M\}$) or ($v \in \{1, \ldots, N\}$). The meshes of the first and second imaging modality may then be defined as:

$x^i = (x_1^i x_2^i \ldots x_M^i)^T$ $i=1, \ldots, S$; referring to the first imaging modality $y^i = (y_1^i y_2^i \ldots y_N^i)^T$ $i=1, \ldots, S$; referring to the second imaging modality As a first processing step, a patient $j \in i=1, \ldots, S$ with a typical organ shape may be selected and a rigid point-based registration may be performed:

$$x^j = R y^j + T$$

to register the mesh of the second imaging modality $y^j$ to the first imaging modality $x^j$ resulting in a registered mesh $y_{reg}^j$. R is the rotation matrix and T the translation vector. A transformation that involved scaling may not be needed since the size difference may be modeled by the shape model of differences, as further described in the following.

In the next step, the remaining meshes $x_i (i \neq j)$ may be aligned to the selected patient $x^j$ and the remaining meshes $y_i (i \neq j)$ may be aligned to the registered reference mesh $y_{reg}^j$. Such alignment may involve a rigid point-based registration (rotation and translation) resulting in $x_{reg}^i = (x_{1,reg}^i x_{2,reg}^i \ldots x_{M,reg}^i)^T$ and $y_{reg}^i = (y_{1,reg}^i y_{2,reg}^i \ldots y_{N,reg}^i)^T$.

Next, the mean meshes of both modalities may be computed as followed:

$$\bar{x} = \frac{1}{S} \sum_{i=1}^{S} \begin{pmatrix} x_{1,reg}^i \\ \vdots \\ x_{M,reg}^i \end{pmatrix} \text{ and } \bar{y} = \frac{1}{S} \sum_{i=1}^{S} \begin{pmatrix} y_{1,reg}^i \\ \vdots \\ y_{N,reg}^i \end{pmatrix}$$

and an eigenvalue analysis of matrix $AA^t$ may be performed with:

$$A = \begin{pmatrix} x_{1,reg}^j - \bar{x}_1 & & x_{1,reg}^S - \bar{x}_1 \\ \vdots & \ldots & \vdots \\ x_{M,reg}^j - \bar{x}_M & & x_{M,reg}^S - \bar{x}_M \\ y_{1,reg}^j - \bar{y}_1 & & y_{1,reg}^S - \bar{y}_1 \\ \vdots & \ldots & \vdots \\ y_{N,reg}^j - \bar{y}_M & & y_{N,reg}^S - \bar{y}_M \end{pmatrix}$$

The shape of the organ-of-interest may now be approximated according to:

$$\begin{pmatrix} x \\ y \end{pmatrix} \approx \begin{pmatrix} \bar{x} \\ \bar{y} \end{pmatrix} + \sum_{k=1}^{p} w_k \begin{pmatrix} \mu_k \\ v_k \end{pmatrix}$$

where $k=1, \ldots, p$ refer to the p greatest eigenvectors and $\mu_k$ and $v_k$ refer to the corresponding normalized eigenvectors of the first and second image modality, respectively. The number p of eigenvalues was determined by $p=S-1$ and $w_k$ are weights.

The shape difference between the two imaging modalities may then calculated as:

$$y - x = \left( \bar{y} + \sum_{k=1}^{p} w_k v_k \right) - \left( \bar{x} + \sum_{k=1}^{p} w_k \mu_k \right) = \bar{y} - \bar{x} + \sum_{k=1}^{p} w_k (v_k - \mu_k)$$

The above steps may be performed by the system of FIG. 1. Having done so, statistical data may be generated which enables the system of FIG. 2 and similar systems to generate a segmentation of the anatomical structure as it may appear in an image acquired by a second imaging modality based on the statistical data and a first segmentation which is obtained from an image acquired by the first imaging modality. For example, the statistical data may comprise the Eigenvectors of the matrix $AA^t$ that belong to the p greatest eigenvectors and the mean meshes $\bar{x}$ and $\bar{y}$. Various alternatives of generating such statistical data are within reach of the skilled person based on this description.

The system of FIG. 2 or similar system may then perform the following steps. Given a non-training image acquired by the first imaging modality, the organ may be segmented using, e.g., the previously described model-based segmentation. This may result in a segmented organ of interest for the first image modality having M vertices:

$$\tilde{x} = (\tilde{x}_1 \tilde{x}_2 \ldots \tilde{x}_M)^T$$

In a first step, the given mesh may be registered to the mean mesh of the first imaging modality $\bar{x}$ leading to a registered mesh $\tilde{x}_{reg}$. The shape of the organ may be approximated by using a weighted sum of the eigenvectors and the mean mesh:

$$\tilde{x} \approx \bar{x} + \sum_{k=1}^{p} \tilde{w}_k \mu_k$$

The weights $\tilde{w}_k$ which may provide the best approximation of the new mesh may be calculated based on:

$$0 \stackrel{!}{=} \tilde{x} - \left( \bar{x} + \sum_{k=1}^{p} \tilde{w}_k \mu_k \right)$$

which minimizes the difference between the approximated mesh and the original mesh. Here, the "!" over "=" symbol is used to denote that the equation should be zero. With $X = \tilde{x} - \bar{x}$ and $M = (\mu_1 \mu_2 \ldots \mu_p)$, this may be rewritten as:

$$X = M\tilde{w}$$

The weighting factors $\tilde{w} = (\tilde{w}_1 \tilde{w}_2 \ldots \tilde{w}_p)^T$ of this overdetermined system may be determined by applying a QR decomposition, e.g., as described in the handbook "*Matrix computations*" 3rd ed., The Johns Hopkins University Press, 1983.

By reformulating the earlier described shape difference y−x, the shape of the organ as it would have been observed in the second imaging modality may now be approximated by:

$$0 \stackrel{!}{=} \tilde{x} - \left(\bar{x} + \sum_{k=1}^{p} \tilde{w}_k \mu_k\right)$$

It is noted that if the numbers of vertices of the mesh of the first imaging modality and the mesh of the second image modality are not the same (M≠N), the numbers may be adapted before this equation can be applied, e.g., by using a mapping that maps the vertices of the left ventricle of the US mesh to their corresponding vertices in the MR mesh.

It will be appreciated that various alternative ways of generating and using the statistical data are conceived and are within reach of the skilled person based on this description. In particular, various other statistical analysis techniques may be instead of principle component analysis (PCA), including but not limited to PCA with Orthomax, sparse PCA, Independent component analysis, Maximum autocorrelation factor (MAF) analysis, Kernel PCA, etc. Moreover, alternatively to linear eigenvalue decomposition, also non-linear decompositions may be used. For example, any suitable non-linear eigenvalue decomposition may be used as introduced in section 3.2 of "*Statistical shape models for 3D medical image segmentation: A review*" by Heimann et al, Medical Image Analysis 13 (2009), pp. 543-563 which is hereby incorporated by reference with respect to the generation of a mean shape.

Exemplary use cases include, but are not limited, to the following.

Volume measurements such as the heart chamber volume or the volume of brain structures may be computed from the volume enclosed by the corresponding mesh structure after adapting the mesh model to an image. Similarly, diameter measurements, etc., may be derived from the mesh structure. The described approach allows to approximately compute the measurement as it would have been observed in the second imaging modality or to provide information about the variation of the measurement between different imaging modalities. This information may be of help in, e.g., follow-up studies to assess disease progression or treatment outcome when different imaging modalities have been used.

For example, clinical guidelines and recommendations for clinical measurements, such as the threshold of the fraction ejection of the left ventricle, are usually defined for a specific imaging modality, but are used in clinical practice independently of the imaging modality as it may be laborious and expensive to use several imaging modalities for diagnoses or clinical treatment planning. This may result in inaccurate or erroneous measurements since the measured quantity may vary, e.g., in size or shape, across different imaging modalities. The described approach allows to approximately compute the measurement as it would have been observed in the second imaging modality.

For interventional guidance, pre-operatively acquired models of one imaging modality are often overlaid onto interventional images of a second imaging modality. The described approach allows to compensate shape differences between both modalities and to generate an intra-operative overlay over the interventional images with improved accuracy.

Figure 5:
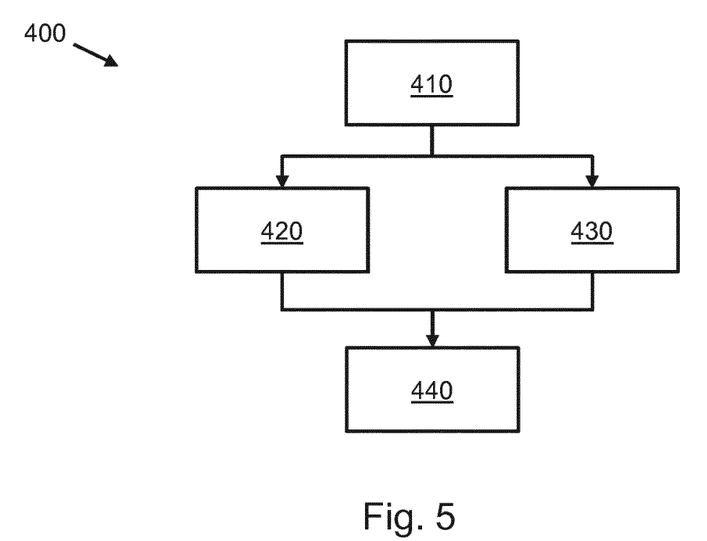
FIG. 5 shows a method for generating statistical data.

FIG. 5 shows a computer-implemented method 400 for generating statistical data. It is noted that the method 400 may, but does not need to, correspond to an operation of the system 100 as described with reference to FIG. 1 and others.

The method 400 comprises, in an operation titled "ACCESSING FIRST SET AND SECOND SET OF IMAGES", accessing 410 a first set and a second set of images of a type of anatomical structure, wherein the first set of images is acquired by a first imaging modality and the second set of images is acquired by a second imaging modality. The method 400 further comprises, in an operation titled "SEGMENTING FIRST SET OF IMAGES", segmenting 420 individual images of the first set of images to obtain a first set of segmentations of the type of anatomical structure. The method 400 further comprises, in an operation titled "SEGMENTING SECOND SET OF IMAGES", segmenting 430 individual images of the second set of images to obtain a second set of segmentations of the type of anatomical structure. The method 400 further comprises, in an operation titled "GENERATING STATISTICAL DATA", based on the first set of segmentations and the second set of segmentations, generating 440 statistical data which is indicative of a difference in shape of the type of anatomical structure between a) the images acquired by the first imaging modality and b) the images acquired by the second imaging modality. For example, generating 440 may comprise generating statistical data which is indicative of a difference in physical shape of the underlying (e.g. actual or real) anatomical structure imaged by the first and second modalities. As described above, the difference in shape represents differences in the shape of the physical anatomy (e.g. the anatomical structure being imaged) which may be due to, for example, the first image modality imaging different parts of the anatomical structure more or less clearly than the second image modality.

Figure 6:
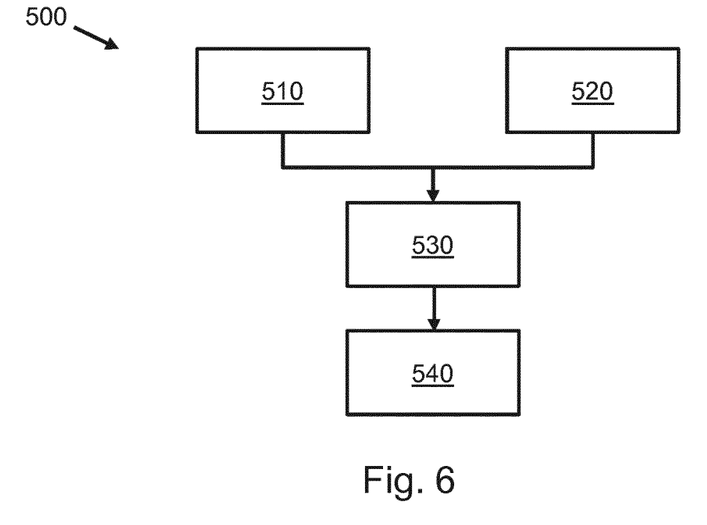
FIG. 6 shows a method for segmentation based on the statistical data.

FIG. 6 shows a computer-implemented method 500 for segmentation based on the statistical data. It is noted that the method 500 may, but does not need to, correspond to an operation of the system 200 as described with reference to FIG. 2 and others.

The method 500 comprises, in an operation titled "ACCESSING IMAGE OF PATIENT", accessing 510 an image of an anatomical structure of a patient, wherein the image is acquired by a first imaging modality. The method 500 further comprises, in an operation titled "ACCESSING STATISTICAL DATA", accessing 520 statistical data indicative of a difference in shape of the type of anatomical structure between a) images acquired by the first imaging modality and b) images acquired by a second imaging modality. Operation 520 may comprise accessing statistical data generated using the method 400 as described above. The method 500 further comprises, in an operation titled "SEGMENTING THE IMAGE", segmenting 530 the image to obtain a first segmentation of the anatomical structure of the patient. The method 500 further comprises, in an operation titled "GENERATING SECOND SEGMENTATION", based on the first segmentation and the statistical data, generating 540 a second segmentation of the anatomical structure which represents an estimate of the shape of the anatomical structure of the patient in an image acquired by the second imaging modality.

It will be appreciated that the operations of FIGS. 5 and 6 may be performed in any suitable order, e.g., consecutively, simultaneously, or a combination thereof, subject to, where applicable, a particular order being necessitated, e.g., by input/output relations.

Figure 7:
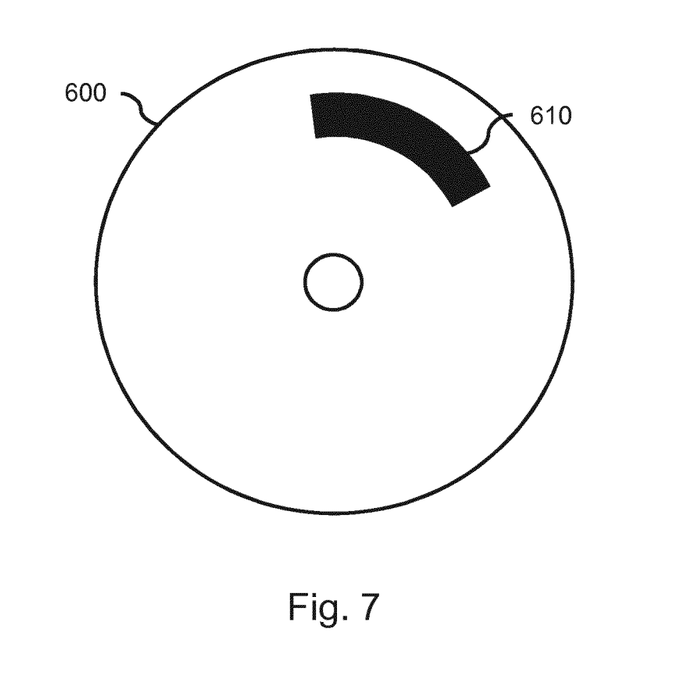
FIG. 7 shows a computer readable medium comprising non-transitory data.

Each method may be implemented on a computer as a computer implemented method, as dedicated hardware, or as a combination of both. As also illustrated in FIG. 7, instructions for the computer, e.g., executable code, may be stored on a computer readable medium 600, e.g., in the form of a series 610 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 7 shows an optical disc 600.

Examples, embodiments or optional features, whether indicated as non-limiting or not, are not to be understood as limiting the invention as claimed.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system configured for image segmentation, comprising:
    an image data interface configured to access an image of an anatomical structure of a patient, wherein the image is acquired by a first imaging modality;
    a memory comprising instruction data representing a set of instructions;
    a processor configured to communicate with the image data interface and the memory and to execute the set of instructions, wherein the set of instructions, when executed by the processor, cause the processor to:
    segment the image to obtain a first segmentation of the anatomical structure of the patient;
    access statistical data indicative of a structural difference in shape of the type of anatomical structure between a) images acquired by the first imaging modality and b) images acquired by a second imaging modality, wherein the statistical data comprises a weighted sum applied to a mean mesh generated from paired images respectively generated by the first imaging modality and the second imaging modality; and
    based on the first segmentation and the statistical data, generate a second segmentation of the anatomical structure which represents an estimate of the structural shape of the anatomical structure of the patient in an image acquired by the second imaging modality.

2. The system according to claim 1, wherein the set of instructions, when executed by the processor, cause the processor to compute a measurement from the second segmentation of the anatomical structure.

3. The system according to claim 2, wherein the measurement comprises at least one of: a volume measurement, a distance measurement, an area measurement, a curvature measurement, a measurement of a circumference, and a measurement of a diameter.

4. The system according to claim 1, wherein the image is a pre-interventional image, and wherein the set of instructions, when executed by the processor, cause the processor to overlay the second segmentation of the anatomical structure over an interventional image which is acquired by the second imaging modality.

5. A method for image segmentation, comprising:
    accessing an image of an anatomical structure of a patient, wherein the image is acquired by a first imaging modality;

segmenting the image to obtain a first segmentation of the anatomical structure of the patient;

accessing statistical data indicative of a structural difference in shape of the type of anatomical structure between a) images acquired by the first imaging modality and b) images acquired by a second imaging modality, wherein the statistical data comprises a weighted sum applied to a mean mesh generated from paired images respectively generated by the first imaging modality and the second imaging modality; and based on the first segmentation and the statistical data, generating a second segmentation of the anatomical structure which represents an estimate of the structural shape of the anatomical structure of the patient in an image acquired by the second imaging modality.

6. A non-transitory computer readable medium comprising instructions that, when executed by one or more processors, cause the one or more processors to:

access an image of an anatomical structure of a patient, wherein the image is acquired by a first imaging modality;

segment the image to obtain a first segmentation of the anatomical structure of the patient;

access statistical data indicative of a structural difference in shape of the type of anatomical structure between a) images acquired by the first imaging modality and b) images acquired by a second imaging modality, wherein the statistical data comprises a weighted sum applied to a mean mesh generated from paired images respectively generated by the first imaging modality and the second imaging modality; and generate, based on the first segmentation and the statistical data, a second segmentation of the anatomical structure which represents an estimate of the structural shape of the anatomical structure of the patient in an image acquired by the second imaging modality.

* * * * *